G. ESTERLY.
Wheel-Cultivator.
No. 14,715.
Patented Apr. 22, 1856.
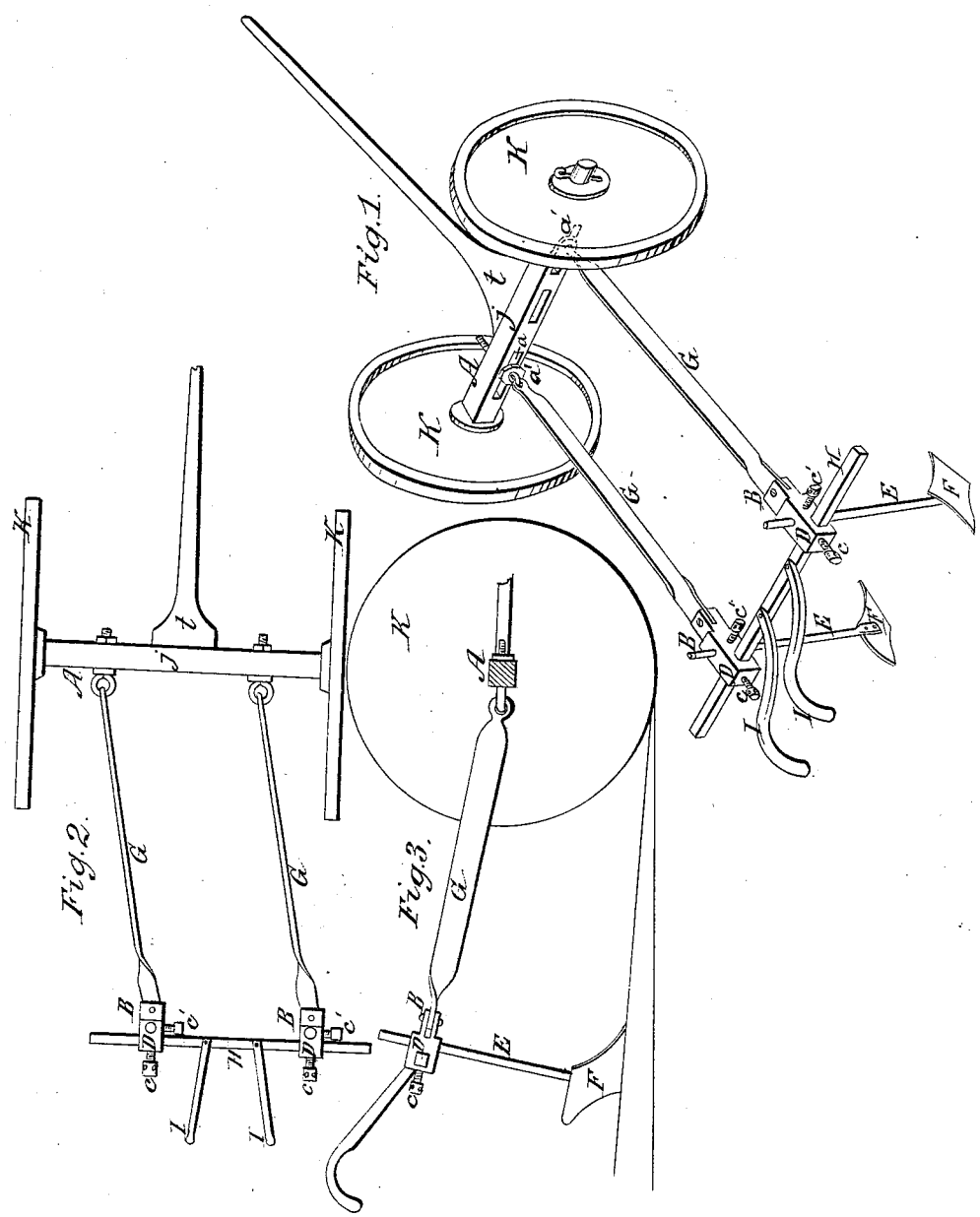

UNITED STATES PATENT OFFICE.

GEORGE ESTERLY, OF HEART PRAIRIE, WISCONSIN.

IMPROVEMENT IN CULTIVATORS.

Specification forming part of Letters Patent No. 14,715, dated April 22, 1856.

*To all whom it may concern:*

Be it known that I, GEORGE ESTERLY, of Heart Prairie, in the county of Walworth and State of Wisconsin, have invented certain new and useful Improvements in Plows and Cultivators for the Cultivation of Corn, Cotton, and other Crops, of which the following is a full, clear, and exact description, reference being had to the accompanying drawings, which make part of this specification, in which—

Figure 1 represents a view in perspective of a machine embracing my improvements; Fig. 2, a plan or top view, and Fig. 3 a side elevation, of the same, the axle-tree being shown in section and one wheel removed.

The object of my invention is to provide a machine capable of thoroughly cultivating corn, cotton, and other row-planted crops, through all their stages, from the time they spring through the soil and are thinned till they have obtained such growth and strength to do without further assistance, or until thoroughly cultivated, thus superseding the necessity of using hoes, as has heretofore been the case.

The advantages of such a machine are self-evident, as it saves both time and labor, while its cost will exceed little, if any, that of a common cultivator. Before proceeding, however, particularly to describe my invention I will first premise, for the more thorough understanding of my improvements, that the machine is intended to straddle the rows, and as they are frequently tortuous and unevenly planted, and the plants themselves, when young, very delicate and difficult of detection from among the luxuriant growth of weeds that generally accompanies them, it will be apparent that it is of vital importance so to construct the machine that the beam which carries the plows may be readily moved from side to side without waiting for the movements of the horses to change their direction, as the delay of a moment may cause the destruction of the plants. It is also necessary that the beam should be capable of being raised in a vertical direction, to enable it to override obstructions and to free the plows from weeds, &c; and, again, as the ground between the rows requires to be as carefully cultivated and freed from weeds as that immediately beside plants, it will be evident that if the same implement is to perform the whole the plows must be so mounted as to be capable of being made to approach or recede from each other as the occasion may require; but, as any new adjustment of those will destroy the parallelism of the bars by which the beam is connected to the truck, it will cause the moldboards of the plows or cultivators to assume a different angle to the rows from that at which they were originally set on moving the beam laterally, to remedy or prevent which the forward ends of the bars are also made capable of adjustment in a lateral direction to correspond with that of their rear ends; and the arms or bars being hinged at their forward ends to the axle-tree in such a manner as to be free to move in a vertical direction, and the beam that carries the slides in which the plow or cultivator standards are secured being attached at their other extremities, it will be perceived that on raising the beam the plows will describe an arc of a circle, the arms forming the radii. Hence if the standards be lengthened it will increase the pitch of the plow, and if shortened lessen it, inasmuch as the points describe arcs of greater and less circles, the natural tendency of the arms being to follow in the plane of the line of draft.

To enable others skilled in the art fully to understand and construct my invention, I will now proceed to particularly describe them.

A A represent hinge-joints connecting the swinging drag-bars or arms G to the axle-tree, J, and which permit them to work in a vertical or lateral direction, the eye-bolts *a*, by one end of which they are hinged, being passed through horizontal slots *a'* in the axle, to which they are secured by means of a nut and screw-thread cut on their opposite extremity. The object of the slots is to enable the arms to approach or recede from each other, as may be desired.

B B represent joints connecting the rear ends of the bars G with the slides D, and which allow them to move in a lateral direction, the slides D being mounted upon a beam or cross-bar, H, and free to move thereon either toward or from each other, they being secured at any required point upon the beam by means of set-screws *c*.

E E represent standards passing vertically through mortises in the slides D, and to which they are secured at any required height by set-screws $c'$ $c'$. On the lower ends of these standards are secured the plow or cultivator mold-boards F F, which are made to approach or recede from each other, according to the purpose for which they are intended to be used, by adjusting the slides D nearer to or farther from each other. When it is desired to throw or turn the soil from the plants the mold-boards are turned on the sides represented in Fig. 1; but when it is required to cover the roots or turn it toward the plants the positions of the mold-boards are reversed—that is to say, they are turned round, so as to be on the inside of the standards, and then secured in that position by the set-screws $c'$ $c'$.

G G represent arms or drag-bars connected by hinged joints to the axle J and slides D, which enable the operator to guide the plows from side to side and in a vertical direction, as occasion may require.

I I represent handles secured to the beam H in any convenient manner, and by which the plows are guided.

J represents the axle on which the wheels K K are mounted, and to which the tongue $t$ is secured.

My machine possesses great advantages over any other now in use from the fact of its working on both sides of the row at once, as it throws, in hilling up the corn, the earth toward it from both sides at the same time, thus preventing the plants from being beaten down and covered up, as is common when cast from one side only; and the ease with which the plows are moved from side to side enables the operator to run them close up to the corn without endangering the safety of the plants, thus superseding the necessity of using the hoe to clear the weeds away from the stalk, and also in turning the mold back again on the roots and round the stem, the earth being thrown through the row from each side.

Having thus fully described the nature of my invention, what I claim therein as new, and desire to secure by Letters Patent, is—

The hanging of two or more plows to a supporting beam or axle by swiveling-joints at each of the ends of their drag-bars, so that said plows may be moved either way laterally without affecting the axle, and still maintain their parallelism; and this I claim whether the stock to which the plows are connected be adjustable in the drag-bars or the plows be adjustable in the stock, or otherwise, substantially as described.

GEORGE ESTERLY.

Witnesses:
A. B. STOUGHTON,
E. COHEN, Jr.